(12) United States Patent
Yin

(10) Patent No.: US 6,356,578 B1
(45) Date of Patent: Mar. 12, 2002

(54) ATTENUATOR

(75) Inventor: Yusong Yin, Stony Brook, NY (US)

(73) Assignee: Photonics Industries International, Inc., Bohemia, NY (US)

(*) Notice: Subject to any disclaimer, the term of this patent is extended or adjusted under 35 U.S.C. 154(b) by 0 days.

(21) Appl. No.: 09/474,589

(22) Filed: Dec. 29, 1999

(51) Int. Cl.⁷ .................................................. H01S 3/08
(52) U.S. Cl. ........................ 372/107; 372/108; 372/98; 372/27
(58) Field of Search ................................ 372/107, 108, 372/98, 99, 27, 29

(56) References Cited

U.S. PATENT DOCUMENTS

| | | |
|---|---|---|
| 4,573,765 A | 3/1986 | Ireland |
| 5,012,473 A | 4/1991 | Reedy |
| 5,103,454 A * | 4/1992 | McKee |
| 5,339,441 A | 8/1994 | Kardos et al. |
| 5,848,080 A | 12/1998 | Dahm |

* cited by examiner

Primary Examiner—Leon Scott, Jr.
(74) Attorney, Agent, or Firm—James A. Quinton, Esq.

(57) ABSTRACT

According to the invention, a variable power laser beam delivery apparatus is provided. The apparatus includes a generator for delivering a preselected wavelength beam preferably an ultraviolet (UV) beam along a beam path. A dichroic mirror, desirably two (2) or more preferably four (4) dichroic mirrors, for transmitting the preselected UV wavelength beam at P-polarization and for highly reflecting the preselected UV wavelength beam at S-polarization are located along the preselected wavelength beam path delivered from the laser beam generator. A beam polarization rotator is mounted along the beam path of the laser beam provided from the laser beam generator. The beam polarization rotator is located between the laser beam generator and the dichroic mirror along the laser beam path. A beam output is provided by directing the beam transmitted by the dichroic mirror or reflected by the dichroic mirror to a preselected location as the output of the device. Alternatively when two beam outputs are desired, both the reflected and the transmitted beam can be used as laser beam outputs.

18 Claims, 3 Drawing Sheets

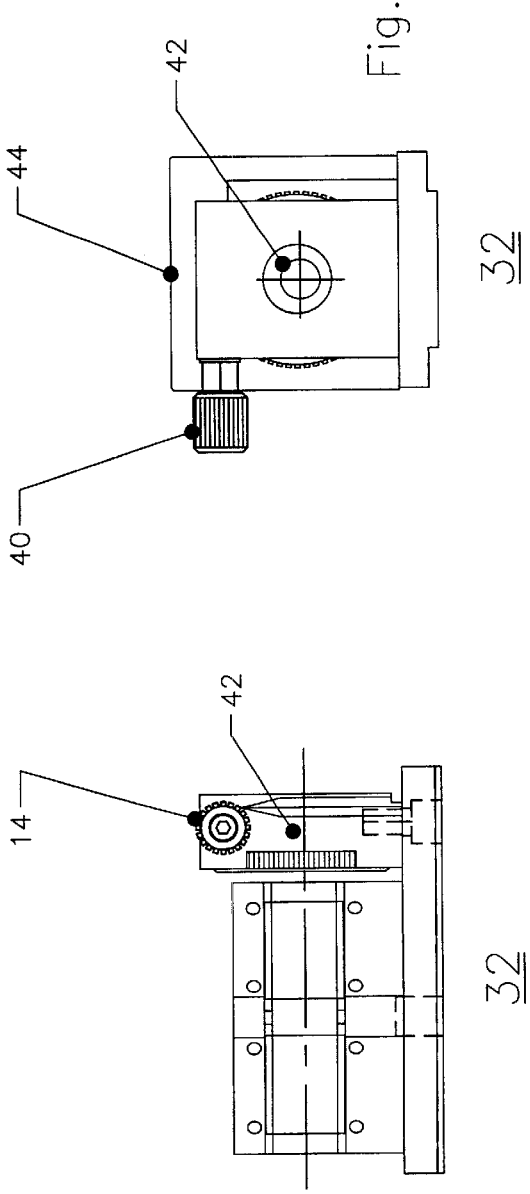

ATTENUATOR

FIELD OF THE INVENTION

The invention relates to an improved variable laser power delivery apparatus and a method for delivery of a variable laser power. The invention also relates to an improved attenuator and an improved polarizer.

BACKGROUND OF THE INVENTION

Laser beams are widely used for a variety of purposes such as drilling, microwelding and the like. It is desirable to be able to vary the power of the laser so that same laser can provide laser beam of variable power. UV beams can be particularly difficult to handle due to the destructive nature of the beams. Prior efforts have been made in this regard. See U.S. Pat. No. 5,103,454. Such prior art devices are cumbersome and may result in the release of unshielded UV radiation into the work place.

SUMMARY OF THE INVENTION

According to the invention, a variable laser power delivery apparatus is provided. The apparatus includes a generator for delivering a preselected polarized wavelength beam preferably an ultraviolet (UV) beam along an optical beam path. A dichroic mirror, desirably two (2) or more, preferably four (4) dichroic mirrors, for transmitting the preselected UV wavelength laser beam at P-polarization and for highly reflecting the preselected UV wavelength laser beam at S-polarization are located along the preselected optical beam path delivered from the laser beam generator. A beam polarization rotator is mounted along the optical beam path provided The beam polarization rotator is located between the laser beam generator and the dichroic mirror along the optical beam path. A beam output is provided by directing the beam transmitted or reflected by the dichroic mirror to a preselected location as the output of the device. Alternatively when two beam outputs are desired, both the reflected and the transmitted beams can be used as laser beam outputs. Preferably the reflected beam is used as the output. Desirably, particularly when a UV beam is used, the unused UV beam from the dichroic mirror is directed to a UV beam block or shield to prevent release of UV radiation into the workplace. Preferably the polarization rotator is a waveplate, most desirably a half waveplate mounted to rotate the polarization of the polarized laser beam. The half waveplate rotates between 0 and 45 degree from its "C" axis so that the polarization of the laser beam can be rotated from 0 to 90 degree prior to the polarized laser beam incidenting on the dichroic mirror.

In operation a laser generator delivers a preselected wavelength polarized laser beam along an optical beam path. The beam is passed across the polarization rotator which is rotatably mounted along the optical beam path. Desirably the beam polarization rotator is a half waveplate which is rotatably mounted to rotate from 0 to 45 from its "C" axis". The polarized UV beam passes through the polarization rotator where the polarization is rotated from 0 to 90. The resulting beam is directed to the dichroic mirror or mirrors where the P-polarized component of the UV beam is transmitted and the S-polarized component of the UV beam is reflected. Depending on the amount of power desired, the polarization rotator is rotated between 0 and 45 degree to vary the amount of transmitted power from 0% to close to 100%.

In another aspect of the invention, multiple dichroic, preferably four (4) mirrors, are provided in optical communication with the beam propagating from the polarization rotator. The beam from the polarization rotator is directed to a first dichroic mirror which is highly reflective for the preselected wave length beam at S-polarization and highly transmissive for the beam at P-polarization. The reflected beam is directed to a second dichroic mirror which is also highly reflective for S-polarization and highly transmissive for P-polarization. The reflected beam is then either used as the output of the laser or directed to additional dichroic mirrors where the S-component is reflected and the P-component is transmitted. Desirably, third and fourth dichroic mirrors are used with the reflected beam of the second dichroic mirror in optical communication with the third mirror and the reflected beam of the third mirror in optical communication with the fourth mirror.

In another aspect of the invention a laser beam polarizer is provided. The polarizer includes two (2) or more dichroic mirrors which are highly reflective at S-polarization and highly transmissive at P-polarization. Each mirror in the polarizer is in optical communication with the next mirror in the series.

For un-polarized laser beam or partially polarized beam, the beam to be linearly polarized incidents on a first dichroic mirror where the S-component of the beam is reflected. The reflected beam is then directed to a second dichroic mirror where the S-component is again reflected and the P-component is transmitted. Optionally, a third and fourth dichroic mirror can be used where the process is repeated. The resulting beam has a high degree of linear polarization. If the S-component is smaller than the P-component when the beam incidents on the first mirror, a polarization rotator can be used to maximize the S-component.

It is an objective to provide laser power attenuator for continousely varing the laser power output with high polarization contrast ratio and broad power tuning range.

It is an objective to provide laser power attenuator, particularly for ultra violet lasers for continuously varing the laser power output with high polarization contrast ratio and broad power tuning range.

It is also an objective to provide laser power polarizer with high polarization contrast ratio and low loss.

Other and further objects will be come apparent from the specification, drawings and claims.

The preferred embodiment of the present invention is illustrated in the drawings description and the examples. However it should be expressly understood that the present invention should not be limited soley to the illustrative embodiment.

BRIEF DESCRIPTION OF THE DRAWINGS

FIG. 2a is a perspective view of the power attenuator of FIG. 2.

FIG. 2b is left side view of FIG. 2a.

FIG. 2c is top view of FIG. 2a.

DETAILED DESCRIPTION OF THE INVENTION

Figure 1:
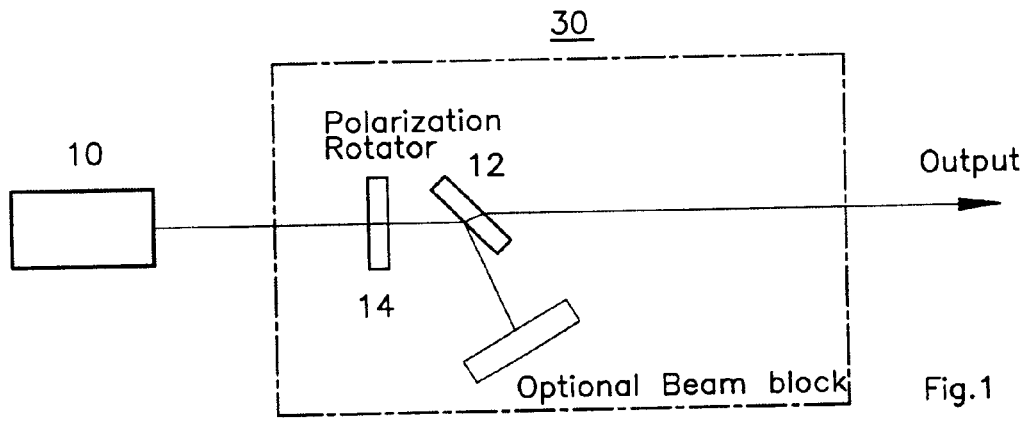
FIG. 1 is a block diagram of a variable power laser beam delivery apparatus according to the invention.

According to the invention, a variable laser power delivery apparatus is provided. In addition, a power attenuator and a polarizer are also provided.

The laser beam delivery apparatus includes a generator for delivering a preselected laser beam preferably an ultraviolet (UV) beam along an optical beam path. A dichroic mirror, desirably multiple, preferably four (4), for transmitting the preselected UV wavelength beam at P-polarization and for highly reflecting the preselected UV wavelength beam at S-polarization are located along the preselected optical beam path delivered from the laser beam generator. A beam polarization rotator is mounted along the optical beam path provided from the laser beam generator. The beam polarization rotator is located between the laser beam generator and the dichroic mirror along the laser beam path. A laser output is provided by directing the beam transmitted by the dichroic mirror(s) or reflected by the dichroic mirror(s) to a preselected location as the output of the device. Alternatively when two beam outputs are desired, both the reflected and the transmitted beam can be used as laser beam outputs. Preferably the reflected beam is used as the output. Desirably, particularly when a UV beam is used, the unused UV beam from the dichroic mirror is directed to a UV beam block or shield to prevent release of UV radiation into the workplace. Preferably the polarization rotator is a waveplate, most desirably a half waveplate mounted to rotate the polarization of the laser beam. The half waveplate rotates between 0 and 45 degree from its "C" axis, so that the polarization of the laser beam can be rotated from 0 to 90 degree prior to the laser beam incidenting on the dichroic mirror.

It has been found that by using the reflected beam instead of the transmitted beam, the efficiency and the polarization contrast ratio of the output beam are improved. The percentage of a beam reflected at S-polarization by a highly reflecting dichroic mirror can be coated at 99% preferably 99.75%, desirably 99.9% or more. The percentage of a beam transmitted by a highly transmitting dichroic mirror at P-polarization is coated at about 96%. It has been found that by using the reflected beam instead of the transmitted beam as the output, a greater percentage of the supplied power can be utilized and a beam having a higher polarization contrast ratio that is a beam having a greater percentage of a single polarization component is provided.

In operation a laser delivers a preselected wavelength beam along a optical beam path. The beam is passed across the polarization rotator which is rotatably mounted along the beam path. Desirably the beam polarization rotator is a half waveplate which is rotatably mounted to rotate from 0 to 45 degrees from its "C" axis. The UV beam passes through the polarization rotator where the polarization is rotated from 0 to 90 degree. The polarization rotated beam is directed to the dichroic mirror or mirrors where the P-polarized component of the UV beam is transmitted and the S-polarized component of the UV beam is reflected. Depending on the amount of power desired, the polarization rotator is rotated between 0 and 45 degree to vary the amount of transmitted power from about 0% to about 100%.

In another aspect of the invention, multiple dichroic, preferably four (4) mirrors, are provided in optical communication with the beam propagating from the beam polarization rotator in the multiple dichroic embodiment. The beam from the polarization rotator is directed to a first dichroic mirror which is highly reflective for the preselected wave length beam at S-polarization and highly transmissive for the beam at P-polarization. The reflected beam is directed to a second dichroic mirror which is also highly reflective for S-Polarization and highly transmissive for P-polarization. The reflected beam is then either used as the output of the laser or directed to additional dichroic mirrors where the S-component is reflected and the P-component is transmitted. Desirably, third and fourth dichroic mirrors are used with the reflected beam of the second dichroic mirror in optical communication with the third mirror and the reflected beam of the third mirror in optical communication with the fourth mirror.

In another aspect of the invention a laser beam polarizer is provided. The polarizer includes a two (2) or more dichroic mirrors which are highly reflective at S-polarization and highly transmissive at P-polarization. Each mirror in the polarizer is in optical communication with the next mirror in the series.

The beam to be polarized incidents on a first dichroic mirror where the S-polarization component of the beam is reflected. The reflected beam is then directed to a second dichroic mirror where the S-polarization component is again reflected and the P-polarization component is transmitted. Optionally, a third and fourth dichroic mirror can be used where the process is repeated. The resulting beam has a high degree of linear polarization. If the S-component is smaller than the P-component when the beam incidents on the first mirror, a polarization rotator can be used to maximize the S-component. The polarizer delivers a beam at low power loss and high polarization contrast ratio.

Referring to FIG. 1 to FIG. 4, a variable laser power delivery apparatus is provided. As best seen in FIG. 1, a laser beam generator desirably a UV Generator 10 provides a UV beam desirably a linearly polarized UV beam to the attenuator 30. Within the attenuator, a polarization rotator is provided to rotate the polarization of the UV Beam from 0 to 90 degrees. Desirably, the polarization rotator is a half wave plate 14 which is rotatable between 0 and 45 degrees from its "C" axis which will rotate the polarization of UV beam from 0 to 90 degrees. The beam propagating from the polarization rotator is directed to dichroic mirror 12, which has been coated to transmit P-polarized beams and reflect S-polarized beams. Preferably, the mirror 12 is oriented at or near the Brewster angle. P-polarized beam passes through mirror 12 and are directed as the output of the attenuator 30. The reflected beam which is S-Polarized, is directed to an optional beam block 16. Optionally, the reflected beam can be used as the output or as an additional output.

Figure 2:
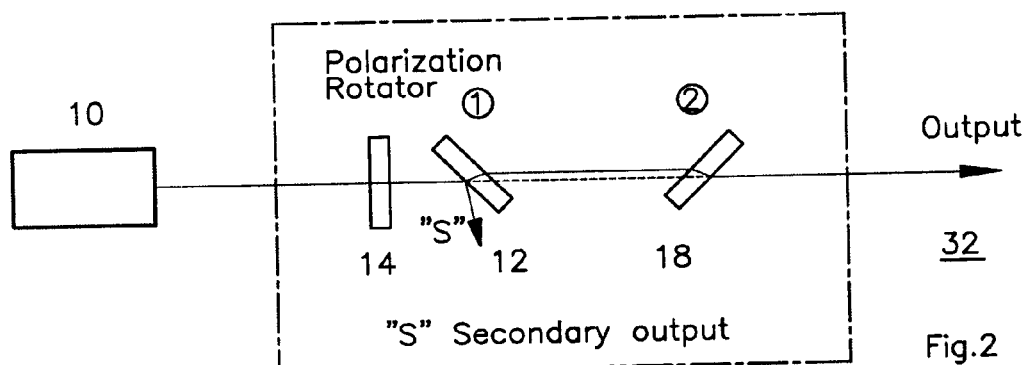
FIG. 2 is a block diagram of an alternate embodiment of variable power laser beam delivery apparatus according to the invention.

Referring to FIG. 2, an alternative attenuator according to the invention is provided. FIG. 2 is similar to FIG. 1. FIG. 2, shows a variable power UV laser delivery apparatus according to the invention. In FIG. 2, a UV 10 generator for delivering a preselected UV wavelength beam along a preselected optical path is provided. Desirably, the delivered beam is a linearly polarized beam. The beam is delivered to attenuator 32, where it first incidences on a UV beam polarization rotator 14 which is mounted to selectively rotate the polarization of the beam from 0–90 degrees. The UV beam polarization rotator is preferably a half wave plate rotatably mounted for rotation from 0 to 45 degrees from its "C" axis to rotate the polarization of the UV beam from 0 to 90 degrees. The beam propagating from the UV beam polarization rotator is directed to dichroic mirror 12, which reflects the S-polarized component of this beam and transmits the P-polarized component of the beam. The beam propagating from mirror 12 is displaced from the original beam path supplied to attenuator 32. An optional displacement compensator 18, which is desirably an uncoated, UV grade fused silica, similar to the substrate used in dichroic mirror 12, although uncoated is provided to return the beam to its original path. The displacement compensator 18 is oriented to compensate for the displacement of the beam caused by its propagation through mirror 12. Optionally, the similar dichroic mirror can be used as the beam displacement compensator instead of uncoated substrate.

Referring to FIGS. 2a through 2c, the power attenuator 32 of FIG. 2 is shown in more detail. The polarization rotator 14 includes a rotatably mounted half-waveplate 42. When knob 40 is rotated, the waveplate is correspondingly rotated so that the polarization of an incoming beam is rotated. Optionally, a motorized desirably a motorized and automated rotation system responsive to a sensed signal is provided. The power output can be controlled by sensing a characteristic (i.e. power) of the output beam and activating the motorized rotation system to rotate the polarization of the incoming beam. Dichroic mirror 12 is provided in optical communication with an incoming preselected wavelength laser beam. Displacement compensator 18 is provided in optical communication with dichroic mirror 12, preferably adjacent to dichroic mirror 12 to compensate for any spatial displacement of the incoming beam. A protective cover 44 is provided around the power attenuator. Preferably the protective cover 44 includes beam blocks which will block any unintended transmission of beam preferably UV beams outside of the attenuator.

In operation, in the device of FIG. 2, a laser beam, preferably a substantially linearly polarized UV beam is provided by the laser beam generator and directed to the attenuator 32. Depending on the desired power output for the particular application, the polarization rotator will be rotated. For example, if about 50% of the power provided by UV generator 10 is desired, the polarization will be rotated about 45 degrees. The resulting power output of the laser-propagating from mirror 18 in FIG. 2, will be approximately 50% of the power delivered by the UV generator.

Figure 3:
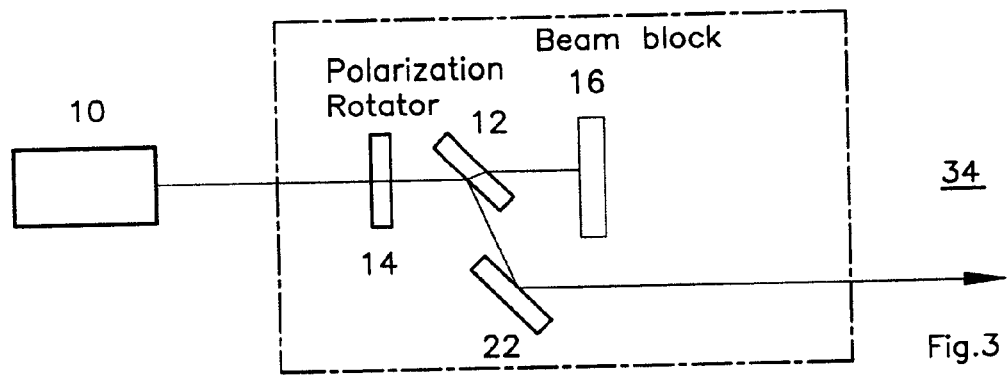
FIG. 3 is a block diagram of an alternate embodiment of variable power laser beam delivery apparatus according to the invention.

Referring to FIG. 3, a laser beam delivery apparatus according to the invention is provided. A laser beam generator preferably UV generator 10 for delivering a preselected UV wavelength beam along a beam path is provided. Desirably, the beam is linearly polarized. The beam is directed to attenuator 34 and incidents first on polarization rotator 14 which has been described with regard to FIG. 1 and FIG. 2. The polarization of the beam is rotated as desired to achieve the desired power output for the UV beam. The beam propagating from polarization rotator 14 is directed to dichroic mirror 12 which has been described previously. P-polarization beam is transmitted by dichroic mirror 12 and is directed to beam block 16 where they are safely dissipated. S-polarization beam is reflected by mirror 12 and directed to dichroic mirror 22 which is highly reflective for S-polarization beam and highly transmissive for P-polarization beam. The S-polarization beam is reflected and directed outside the attenuator as the output.

Figure 4:
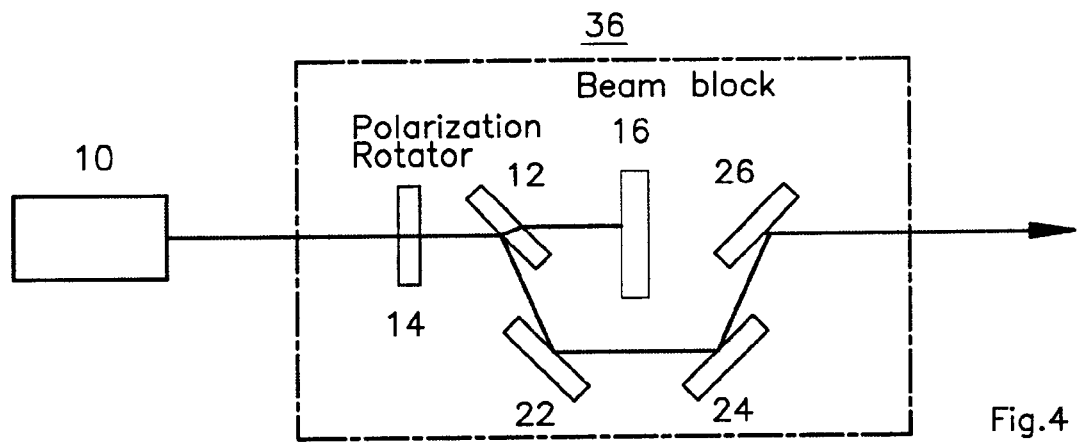
FIG. 4 is a block diagram of an alternate embodiment of variable power laser beam delivery apparatus according to the invention.

Referring to FIG. 4, which is a further alternative embodiment of the variable power UV laser beam delivery apparatus according to the invention, UV generator 10 delivers a UV wavelength beam along a predetermined path to incident on polarization rotator 14 where the polarization of the beam is rotated as previously described. The beam incidences on dichroic mirror 12 where the P-polarization component of the beam is transmitted and the S-polarization component of the beam is reflected. In this embodiment, the p-polarization component is directed to a beam block 16 and safely blocked. The reflected S-polarization component of the beam is directed to dichroic mirror 22 which is oriented at or near the Brewster angle to the incoming beam and again the s-polarization component of the beam is reflected and P-polarization component is transmitted. The reflected S-component of the UV beam is directed to incident on dichroic mirror 24 where the S-component again is reflected and the P-component is transmitted. The reflected S-component of the UV beam is then directed to incident on dichroic mirror 26 which reflects S-component of the UV beam and transmits P-component. The resulting reflected beam from mirror 26 is directed as the output of the attenuator. The mirrors 12, 22, 24 and 26 are all preferably oriented at or near the Brewster angle to the incoming beam.

In operation, a UV beam, for example, a fourth harmonic beam of Nd:YAG or Nd:YVO4 laser at 266 nm UV is provided. Desirably the polarization rotator is a half waveplate. Depending on the desired power output sought by the user, the half waveplate is rotated from 0 to 45 degrees to vary the power of the resulting output beam. Thus, for example, if a 5 watt beam is supplied by generator 10 and a 2.5 watt output is desired, the polarization rotator, that is the half wave plate, is rotated about 22.5 degree to obtain the desired polarization. Assuming a linearly polarized beam is provided by UV generator 10, the polarization rotator would be rotated to rotate the polarization of the beam about 45 degrees in order to provide an output beam having approximately one half the power output of the input beam. The beam propagating from the polarization rotator 14 is directed to dichroic mirror 12 where the S-component is reflected and the P-component is transmitted. Desirably, mirror 12 reflects 99% or greater, preferably 99.5% or greater of the s-polarized component of the UV beam. Approximately 96% of the P-component is transmitted by mirror 12 and 4% is reflected. The reflected P and S components are directed to incident on mirror 22 where again 99%, preferably 99.5% or greater of the S-component of the beam is reflected and approximately 96% of the P-component is transmitted. The reflected beam from mirror 22 is directed to mirror 24 where again 99%, preferably 99.5% or greater of the S-component of the UV beam is reflected and about 96% of the P-component is transmitted. The reflected beam from mirror 24 is directed to dichroic mirror 26 where again 99%, preferably 99.5% or greater of the S-component is reflected and about 96% of the P-component is transmitted. The reflected component from mirror 26 is the output of the device. The resulting output beam is collinear with the input beam, that is there is minimum spatial displacement of the beam as a result of being reflected through the four (4) mirrors. Optionally, a beam block 16 is provided behind mirror 12 in the path of the transmitted P-component to safely block the transmitted UV radiation. Optionally, the housing of the attenuator 36 can also serve as a beam block. Such a housing can be adequate to absorb the UV beam transmitted by mirrors 22, 24 and 26 which is small in comparison to the amount transmitted by mirror 12. The resulting beam delivered from the attenuator 36 of FIG. 4 has numerous advantages, as compared with conventional attenuators and also as compared with the attenuator of FIG. 2. Use of the attenuator according to the invention as shown in FIG. 3 and FIG. 4 in a UV laser beam delivery apparatus, results in low loss of power from the beam supplied to the attenuator. In addition, a high polarization contrast ratio is provided. The polarization contrast ratio is defined as the transmitted power at the intended polarization divided by the transmitted power at the unwanted polarization. In addition, a broad power tuning range for the inputted beam is provided.

Example 1, shows a comparison of the characteristics of the variable power UV laser beam delivery devices of FIGS. 1 to 4.

EXAMPLE 1

The four (4) variable power laser beam delivery devices according to FIGS. 1 to 4 are compared. The dichroic mirrors used are highly reflective at S-polarization and highly transmissive at P-polarization. Highly reflective dichroic mirrors have a 99% or greater reflection capacity at S-polarization in the UV range. Highly transmissive dichroic mirrors have a transmission capacity of about 96% in the UV range. The dichroic mirror characteristics here are Rs=99.5%, Rp=4.0%, Tp=96.0% and Ts=0.5% with incident angle at about 56 degree at wavelength at 266 nm.

|  | FIG. 1 | FIG. 2 | FIG. 3 | FIG. 4 |
|---|---|---|---|---|
| Max. Power | 96% | 92% | 99% | 98% |
| Contrast Ratio | $5.2 \times 10^{-3}$ | $2.7 \times 10^{-5}$ | $1.6 \times 10^{-3}$ | $2.56 \times 10^{-6}$ |
| Min. Power | 0.52% | 0.0027% | 0.16% | 0.000256% |
| Power Tuning Range | 0.52% to 96% | 0.0027% to 92% | 0.16% to 99% | 0.000256% to 98% |

The devices of FIG. 3 and FIG. 4 have particularly superior qualities:

1. Low loss through beam attenuator.

2. High polarization contrast ratio: defined as Transmitted Power @ intended polarization/Transmitted power @ un-intended polarization.

3. Broad power tuning range of input linearly polarized UV beam.

Referring to Example 1", the devices of FIGS. 3 and 4 are superior to the devices of FIG. 1 and 2. Both the devices of FIG. 2 and FIG. 4 have collinear input and the output paths. It can be seen from Example 1 that the maximum power for the device of FIG. 4 is 98%, whereas the device of FIG. 2 the maximum power is only 92%. Regarding the contrast ratio, (the polarization purity of the beam), the device of FIG. 4 is ten (10) times better than the device of FIG. 2. In addition, the minimum power capability for the device of FIG. 4 is superior to the device in FIG. 2. Finally, the power tuning range for the device of FIG. 4 is superior to that of FIG. 2.

It can be seen that the device of FIG. 3 is superior to the device of FIG. 1. FIG. 1 and FIG. 3 are devices where input path is spatially displaced by the device. The maximum power transmission for the device of FIG. 3 is 99%, whereas the maximum power for the device FIG. 1 is 96%. Regarding the contrast ratio, that is the purity of the polarization of the output beam, the device of FIG. 3 is two (2) times better than that provided by FIG. 1. In addition, the minimum transmission supplied by the device of FIG. 3 is superior to that provided by the device in FIG. 1 and the power tuning range is also superior.

Figure 5:
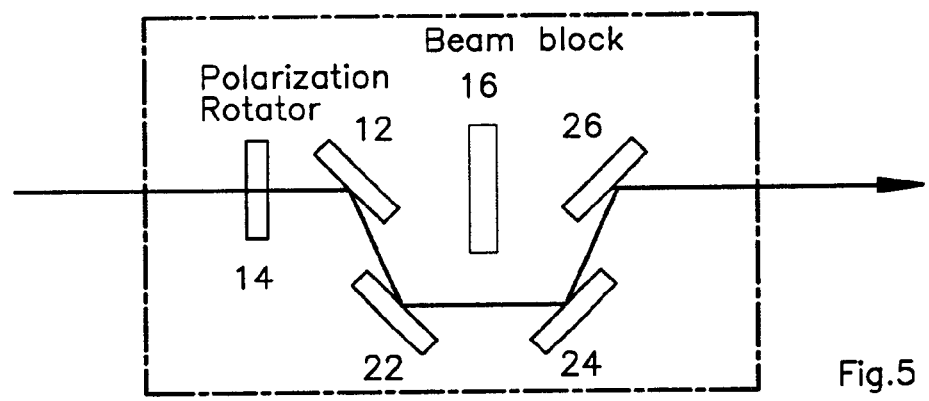
FIG. 5 is a block diagram of a polarizer according to the invention.

According to the invention, a beam polarizer is also provided. The beam polarizer includes two (2) or more dichroic mirrors, preferably three (3) or more, desirably four (4). Referring to FIG. 5, four (4) dichroic mirrors are provided in optical communication with one another. The beam to be polarized is directed to mirror 12 where the S-polarization component is reflected to mirror 22 where the S-polarization component is reflected to mirror 24 where the S component is reflected to mirror 26 which reflects the beam outside the polarizer. A low loss, polarization device is provided. An addition, the contrast ratio is very high.

Desirably, the input beam incidents on mirror 12 so that the primary polarization component incidents on the beam at S-polarization. If the S-polarization component relative to mirror 12 is small, an optional beam polarization rotator can be used to rotate the polarization of the incoming beam to maximize the incidenting at S-polarization on beam 12. Preferably, the dichroic mirrors 12, 22, 24 and 26 are all oriented at or near the Brewster angle to incoming beam. An optional beam block can be provided.

The foregoing is considered as illustrative only to the principals of the invention. Further, since numerous changes and modification will occur to those skilled in the art, it is not desired to limit the invention to the exact construction and operation shown and described above, and accordingly, all suitable modifications and equivalents may be resorted to falling within the scope of the invention.

What is claimed is:

1. A variable laser power delivery apparatus having selectable power output comprising:

a laser beam generator for delivering a preselected polarized wavelength beam along an optical beam path;

a dichroic mirror transmitting the preselected wavelength beam at P-polarization and reflecting the preselected wavelength beam at S-polarization;

said dichroic mirror located along said beam path in optical communication with said laser beam generator so that said beam incidents on said dichroic mirror;

a beam polarization rotator mounted along said beam path in optical communication with both said laser beam generator and said dichroic mirror; said beam polarization rotator located between said beam generator and said dichroic mirror so that said beam passes through said polarization rotator and adjustment of said rotator rotates the polarization of said beam prior to said beam incidenting on said dichroic mirror;

means to direct either the transmitted or reflected beam along an output path as the output of the apparatus;

means to adjust the polarization rotator of said preselected wave length beam to rotate the polarization of the preselected wavelength beam to change the ratio of P-polarization versus S-polarization at said dichroic mirror to select a desired power output of the apparatus.

2. A variable laser power delivery apparatus according to claim 1 wherein said preselected wavelength beam is a substantially linearly polarized beam.

3. A variable laser power delivery apparatus to claim 2 wherein said preselected wavelength beam is a UV beam.

4. A variable laser power delivery apparatus according to claim 3 wherein the transmitted wavelength beam is directed on said output path as the output.

5. A variable laser power delivery apparatus according to claim 4 wherein said beam polarization rotator is a half waveplate.

6. A variable laser power delivery apparatus according to claim 5 wherein said beam polarization rotator is a half waveplate rotatably mounted to rotate between 0 and 45 degree so that the polarization of said beam can be rotated from 0 to 90 degree prior to said beam incidenting on said dichroic mirror.

7. A variable laser power delivery apparatus according to claim 4 further comprising a displacement compensator mounted along said output path to compensate for displacement of said transmitted beam.

8. A variable laser power delivery apparatus according to claim 3 wherein said reflected UV wavelength beam travels along a reflection path; further comprising a UV beam block located along said reflection path to prevent leakage of reflected beam outside said delivery apparatus; said transmitted beam directed along said output path as the output of said apparatus.

9. A variable laser power delivery apparatus comprising:
a laser beam generator for delivering a preselected polarized wavelength beam along a beam path;
a first dichroic mirror transmitting the preselected wavelength beam at P-polization and reflecting the preselected wavelength beam at S-polarization along a fist reflection path;
said first dichroic mirror located along said beam path so that said beam incidents on said first dichroic mirror;
a beam polarization rotator mounted along said beam path; said beam polarization rotator located between said beam generator and said first dichroic mirror so that said beam passes through said polarization rotator and adjustment of said polarization rotator rotates the polarization of said beam prior to said beam incidenting on said first dichroic mirror to change the ratio of P-polarization versus S-polarization of said preselected wavelength beam at said first dichroic mirror and thereby vary the power of the beam reflected by said first dichroic mirror;
a second dichroic mirror located along said first reflection path;
said second dichroic mirror transmitting the preselected wavelength beam at P-polarization and reflecting the preselected wavelength beam at a S-polarization along a second reflection path;
means to direct said preselected wavelength beam propagating along said second reflection path outside said apparatus.

10. A variable laser power delivery apparatus comprising:
a laser beam generator for delivering a preselected wavelength beam along a beam path;
a first dichroic mirror transmitting the preselected wavelength beam at P-polarization along a first transmission path and reflecting the preselected wavelength beam at S-polarization along a first reflection path;
said first dichroic mirror located along said beam path so that said beam incidents on said dichroic mirror;
a beam polarization rotator mounted along said first reflection path, said beam polarization rotator located between said laser beam generator and said dichroic mirror so that said beam passes through said polarization rotator and adjustment of said polarization rotator rotates the polarization of said beam prior to said beam incidenting on said first dichroic mirror to change the ratio of P-polarization verses S-polarization of said preselected wavelength beam at said first dichroic mirror and thereby vary the power of the beam reflected by said first dichroic mirror;
a second dichroic mirror located along said first reflection path;
said second dichroic mirror transmitting the preselected wavelength beam at P-polarization and reflecting the preselected wavelength beam at S-polarization along a second reflection path;
a third dichroic mirror transmitting said preselected wavelength beam at P-polarization and reflecting the preselected wavelength beam at S-polarization along a third reflecting path;
said third dichroic mirror located along said second reflection path;
a fourth dichroic mirror transmitting said preselected wavelength beam at P-polarization and reflecting the preselected wavelength beam at S-polarization along a fourth reflection path;
said fourth dichroic mirror located along said third reflection path;
means to direct preselected wavelength beam propagating along said fourth reflection path outside said apparatus.

11. A variable laser power delivery apparatus according to claim 10 wherein said preselected wavelength beam is a substantially linearly polarized beam.

12. A variable laser power delivery apparatus according to claim 11 wherein said preselected wavelength beam is a UV beam.

13. A variable laser power delivery apparatus according to claim 12 wherein said polarization rotator is a waveplate.

14. A variable laser power delivery apparatus according to claim 11 wherein said polarization rotator is a half waveplate rotatably mounted to rotate between 0 and 45° so that the polarization of said preselected wavelength beam can be rotated from 0 to 90° prior to said beam incidenting on said dichroic mirror.

15. A variable laser power delivery apparatus according to claim 14 further comprising in a beam block located along said first transmission path.

16. A laser beam attenuator having a selectable power output comprising:
a. laser beam polarization rotator for rotation of the polarization of a preselected wavelength laser beam;
b. means to direct a laser beam to be incident on said polarization rotator;
c. a dichroic mirror coated for transmitting said preselected wavelength laser beam at P-polarization along a transmission path and reflecting the preselected wavelength laser beam at S-polarization along a reflection path; said dichroic mirror in optical communication with said polarization rotator;
d. means to selectively adjust the polarization rotator to rotate the polarization of the laser beam to change the ratio of P-polarization versus to S-polarization;
e. means to direct said polarization rotated laser beam to be incident said first dichroic mirror.

17. A laser attenuator having a selectable output comprising;
a. a laser beam polarization rotator for rotation of the polarization of a preselected UV wavelength beam;
b. means to direct a laser beam to incident on said polarization rotator;
c. means to selectively adjust the polarization rotator to rotate the polarization of the laser beam to control the power output of said attenuator;
d. means to direct said polarization rotated laser beam to incident on a first dichroic mirror;
e. said first dichroic mirror coated for transmitting said preselected wavelength laser beam at P-polarization along a first transmission path and reflecting the preselected wavelength beam at S-polarization along a first reflection path;
f. a second dichroic mirror located along said first reflection path;
g. said second dichroic mirror coated for transmitting said preselected wavelength beam at P-polarization and reflecting the preselected wavelength beam at S-polarization along a second reflection path;

h. a third dichroic mirror coated for transmitting said preselected wavelength beam at P-polarization and reflecting the preselected UV wavelength beam at S-polarization along a third reflection path;

said third dichroic mirror located along said second reflection path;

a fourth dichroic mirror for transmitting the preselected wavelength beam at P-polarization and reflecting the preselected wave length beam at S-polarization along a fourth reflection path;

said fourth dichroic mirror located along said third reflection path;

means to direct said preselected wavelength beam propagating along said fourth reflection path outside said attenuator;

whereby rotation of the polarization of the laser beam controls the power of the preselected wavelength beam propagating on said fourth reflection path outside said attenuator.

18. A laser beam polarizer comprising;

a. a first dichroic mirror coated for transmitting a preselected wavelength beam at P-polarization along a first transmission path and reflecting the preselected wavelength beam at S-polarization along a first reflection path;

b. a second dichroic mirror located along said first reflection path;

c. said second dichroic mirror coated for transmitting said preselected wavelength beam at P-polarization and reflecting the preselected wavelength beam at S-polarization along a second reflection path;

d. a third dichroic mirror coated for transmitting said preselected wavelength beam at P-polarization and reflecting the preselected wavelength beam at S-polarization along a third reflection path;

said third dichroic mirror located along said second reflection path;

a fourth dichroic mirror for transmitting said preselected wavelength beam at P-polarization and reflecting the preselected wavelength beam at S-polarization along a fourth reflection path;

said fourth dichroic mirror located along said third reflection path;

means to direct said preselected wavelength beam propagating along said fourth reflection path outside said polarizer.

\* \* \* \* \*